United States Patent [19]

Hrusoff et al.

[11] Patent Number: 5,724,225
[45] Date of Patent: Mar. 3, 1998

[54] LAPTOP COMPUTER CARRYING TRAY

[76] Inventors: John Hrusoff, 1910 Marthas Rd., Alexandria, Va. 22307; Chris Saladyga, 8508 16th St., #621, Silver Spring, Md. 20710; Marissa Cachero, 370 Taylor St., S-21, Washington, D.C. 20017

[21] Appl. No.: 539,372

[22] Filed: Oct. 5, 1995

[51] Int. Cl.⁶ .................. G06F 1/16; A45F 5/00
[52] U.S. Cl. ............. 361/683; 224/270; 224/607; 224/930; D3/276; D14/106; 206/305
[58] Field of Search .................. 224/270, 257, 224/258, 259, 607, 608, 610, 615, 616, 617, 646, 627, 930; 206/306, 320; D3/276, 287, 292, 215, 304, 274; D14/106; 108/43; 361/680–683; 364/708.1

[56] References Cited

U.S. PATENT DOCUMENTS

| D. 358,483 | 5/1995 | Cross et al. | D3/276 |
| 4,715,293 | 12/1987 | Cobbs | 108/43 |
| 4,946,120 | 8/1990 | Hatcher | 108/44 X |
| 5,105,338 | 4/1992 | Held | 361/683 |
| 5,177,665 | 1/1993 | Frank et al. | 361/683 |
| 5,186,375 | 2/1993 | Plonk | 108/43 X |
| 5,214,574 | 5/1993 | Chang | 361/680 |
| 5,263,423 | 11/1993 | Anderson | 108/43 |
| 5,325,970 | 7/1994 | Dillon et al. | 206/320 X |
| 5,346,111 | 9/1994 | Huntley et al. | 224/265 |
| 5,526,970 | 6/1996 | Yates | 224/930 X |
| 5,533,655 | 7/1996 | Duque | 224/930 X |
| 5,542,314 | 8/1996 | Sullivan et al. | 361/683 X |
| 5,551,615 | 9/1996 | McIntosh | 224/607 X |

FOREIGN PATENT DOCUMENTS 424589  5/1911  France ................... 224/270

Primary Examiner—Michael W. Phillips
Attorney, Agent, or Firm—Penrose Lucas Albright

[57] ABSTRACT

A supporting device for a laptop type model computer unit. The device is constructed and arranged for the support and stabilization of the laptop computer or notebook type computer unit when directly positioned in front of, or before, the user in order to permit the maximum amount of stability and thus allowing the operator to freely stand, sit, walk, carry, or move about with the computer unit intact when in an upright position with little or no stress. The instrument, when in its operational position, has an over the shoulder or over the neck strap, connecting the central computer carrying tray directly before or perpendicular to the user's body. Because the instrument is arranged perpendicularly to the body, the user has maximum stability of the entire computer unit and access to its operational surface.

15 Claims, 4 Drawing Sheets

LAPTOP COMPUTER CARRYING TRAY

FIELD OF THE INVENTION

The present invention relates in general to the field of computers and their stabilization upon or within a self-contained surface. More specifically, the present invention discloses a stabilization and support system for a laptop or notebook type model computer unit of the type consisting of two casements of similar or near equal dimension which self-enfold onto a single flat plane surface, and more particularly, to a laptop type model computer unit which when positioned in a directly perpendicular orientation to the user's body, as when in its operational mode, allows complete freedom and stability for the user's hands when placed upon the computer unit's keyboard or surface, thus allowing the user to relieve the burden of holding, clasping, or mounting the unit upon a flat horizontal surface typically when in its operational mode.

BACKGROUND OF THE INVENTION

Personal computers of the type used portably and transported by and within various working environments have as of recent date proved effective tools for centralizing transactions and communications on a variety of levels, many of which have contributed to the transformation of the workplace from several environments to a single, portable office. Components which had formerly made use in accommodating the various instruments necessary to fulfill a number of computer-based tasks now prove impractical in centralizing a single workspace. Because no effective means has yet been made available for providing accessibility while concurrently stabilizing, securably supporting and simultaneously allowing for the transport of the central computer unit by way of a single assemblage, the task of consolidating several work stations at separate points has for some proved cumbersome.

The need thus exists for a securable and protectable means designed for the purpose of encasing the laptop or notebook-type computer unit. In this manner, a secureable protection and stabilization means for permitting easy access to and of the entire laptop computer unit's surface, both when in its use as well as when transported by way of a concurrent means, is incorporated in the present invention.

While some receptacles were similar in concept, but not in design, to the instrument submitted here, none within the scope of their application went beyond the immediate purpose of carrying a large number of separate removeable objects which were intended to be taken from or added to the immediate carrying tray. For example, the tray type once used for the purpose of selling or distributing various moveable material may have included those used by tobacco and cigarette salespersons, political conventioneers whose trays may have contained buttons or penants, or, as seen more recently in use, those refreshment trays used by hotdog or beverage vendors within baseball parks or at sporting events in general.

These tray units were in most oases designed for the express purpose of the display of such objects contained within the various receptacle or housing unit where the within the various receptacle or housing unit where the prospective customer, consumer, or potential draftee, upon seeing, could gain frontal visual contact with the various articles contained therein, specifically, access away from the carrier.

Further, while the previous concepts utilized a carrying principal, nowhere had their application expressly been to stabilize or support a type of instrumentation whose sole purpose was to allow the user a direct access and stabilization for a specific embodiment which permitted the user a visual vantage point set at a forty-five degree angle, the perpendicularity of the said instrument positioned in respect to their body.

The laptop carrying tray of the present invention differs from conventional receptacle trays in four respects;

First, while the vendor unit utilized elements which might allow for the containment of the tray's immediate contents, no particular stabilization feature was employed for a single instrumentation to be encased within its housing unit. Moreover, none of these conventional trays had stabilizing features or secureable elements for the purpose of securing an encasement consisting of two single planes or an apparatus which on a whole was designed to accommodate an instrument whose construction was two-dimensional. The laptop computer unit, when stabilized in its open position, relies upon the support of two panels, both expandable and retractable when positioned at various angles, which when secured within the present invention each additionally relies upon the support of two elements, the housing component of the central carrying tray and the lid feature which supports the screen element of the laptop or notebook-type computer.

Secondly, those trays previously designed were expressly developed not for a single, but rather several moveable objects (e.g., drinking cups or various sundry items) for which the wearer could either move about those objects or reposition them within their respective place within the same tray.

Thirdly, while the previous trays may have allowed for the transport of several specific objects held within their housing unit, none of these instruments were designed in a manner which would allow the user, upon carrying such articles, to freely tilt the tray unit as a whole beyond its standard horizontal position, which would in turn spill those contents contained within the tray itself.

Lastly, the present instrument, while its purpose is to provide support and access for the user to the portable laptop computer unit's horizontal or keyboard surface and its respective corresponding screen, normally seen at a forty-five degree angle when held immediately in front of or before the user's body at a perpendicular orientation, additionally provides for the quick adjustment of the computer unit's position by means of the conjunction with the strap assembly and the lid element, which when used together contemplate a method for the quick self-containment and carry of the unit as a whole over the user's shoulder.

The present instrument's carrying tray surrounds the lower, horizontal casement of the central body of the laptop computer unit, clasping by way of the carrying tray's interior sidewalls and partially-open front and rear walls a portion of the edge of the laptop computer unit's outermost sidewall, front and rear surfaces.

The laptop computer unit is placed within the housing compartment of the present invention's central carrying tray by sliding the lower horizontal casement along the sidewalls to a point where it rests against the partially-open front and rear walls which in conjunction to the sidewalls act as stabilizers to the laptop computer unit. The horizontal attitude, once the laptop computer unit is secured within the central carrying tray, is thus stabilized no matter what position the user may be in when sitting or rising up in order to stand or freely walk about with the entire unit intact without ever deterring the user's access to either surface of the computer itself. Nor does the present instrument require that the user, when before the laptop unit, be seated or in any specific position. Because the support straps connecting the central carrying tray allow for adjustability in both their length and in direct proximity to the the front of the body, the user may move about at several angles without ever actually compromising accessibility to or stabilization of the unit.

Stress is equalized along the the strap, which when arranged in an A-shaped, or more specifically, lambda-shaped (λ) position, allows for the distribution of the unit's weight to be channeled equally in proportion to its permanent horizontal position before the front of the user's body.

Stress may further be relieved by adjustment of the strap with respect to its assembly which acts like a swinger, allowing for the strap's direct extension or recoiling in respect to their ends which clasp onto the front and rear corners of the instrument's outermost edge balancing in a manner much like a cradle or truss-design support unit. Further, in accordance with the above embodiment, the strap assembly, which extends from the attachable ends to the central carrying tray, may be secureably adjusted in respect to the user's neck and shoulders which support the unit as a whole.

DESCRIPTION OF THE RELATED ART

Examples of inventions associated with portable tray or carrying units will be found in the prior art.

SUMMARY OF THE INVENTION

It is broadly an object of the present invention to provide a support for a laptop model type computer unit when positioned directly in a perpendicular orientation to the computer unit user's body in order to permit the user to operate the unit with little stress or the manner in which he might normally encounter when placing the laptop model computer unit upon a flat, horizontal, or stationary surface.

It is therefore an object of the present invention to provide a wholly new and efficient means for carrying and having access to a laptop model type computer with little or no stress.

A further object of the present invention is to provide a support for the laptop model type computer over the shoulders of the user by means of securable and adjustable straps.

A further object of the present invention is to provide a support for the laptop model type computer by providing a lid element attachable to the central carrying tray.

It is another object of the present invention to provide a support which is of a wholly durable and reliable construction.

It is a further object of the present invention to provide for the user accessibility to the flat, horizontal orientation of the laptop model type's keyboard surface.

An even further object of the present invention is to provide visibility to the laptop type model's screen and adjoining keyboard when viewed in a perpendicular orientation in respect to the user's body.

Still yet another object of the present invention is to provide for visability of the laptop type model computer unit's screen, flat keyboard surface and all instrumentation within the computer unit when viewed from a stationary perspective in respect to the user's body.

Even still another object of the present invention is to provide for the accessibility and operation of the laptop type computer unit model with the direct support of the flat, four-sided tray attached to the shoulder straps.

Even still another object of the present invention is to provide for a laptop computer carrying tray which may be easily and efficiently manufactured and marketed.

Lastly, it is an object of the present invention to provide a wholly new laptop model type computer carry-tray consisting of a flat, rectangular tray having an open top, a closed bottom, two side walls, a front wall and partially open rear wall. A laptop model type computer unit is secured between the two side walls, the front and rear wall, resting atop the closed bottom and lid element. Two adjustable shoulder straps, both secured to each of the topmost four corners of the side walls of the flat, rectangular compartment. An adjustment means is provided onto the two shoulder straps.

Specifically, it is within the contemplation of one aspect of the present invention to provide for the user a support which allows the operation of the instrument with little stress or the sacrifice of stability of the type generally associated with the operation and transportation of the laptop type model computer unit.

BRIEF DESCRIPTION OF THE DRAWINGS

The above description, as well as further objects, features and advantages of the present invention, will be more fully understood in reference to the following description.

DETAILED DESCRIPTION OF THE PREFERRED EMBODIMENT

Figure 1:
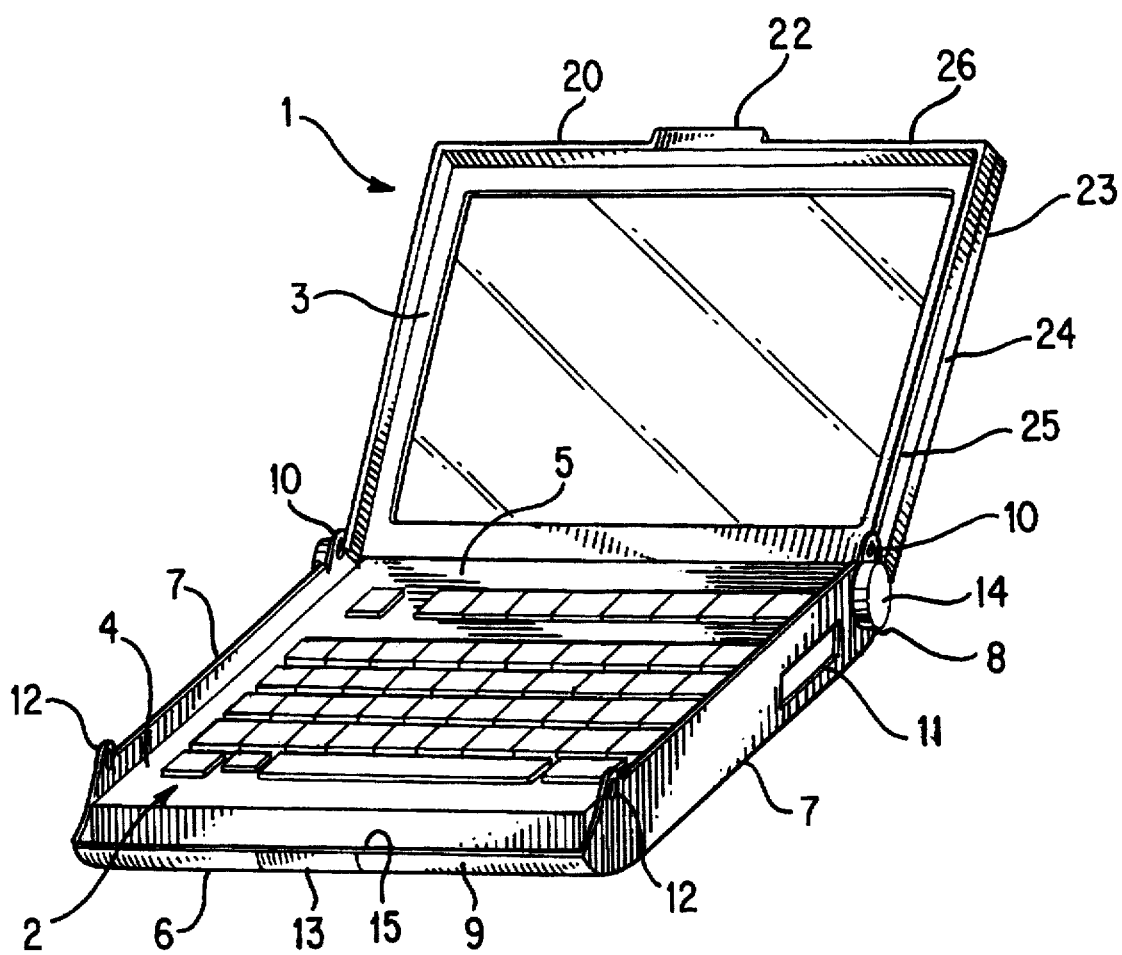
FIG. 1 is a perspective view showing the laptop computer unit mounted within the present invention as illustrated without the place of a user.

With reference now to the drawings, wherein like reference numerals indicate like elements, there is shown a laptop model type computer unit resting within the present invention, the user operating the laptop computer within the laptop computer carrying support tray.

Specifically, it will be noted in the various Figures that the invention relates to a carrying tray for providing a securable support for the laptop model computer unit. In its broadest context, the device consists of an open rectangular tray, a hingedly attached lid a security catch, two adjustable shoulder straps securably attachable to the central carrying tray with an adjustment means, a front, rear and side cover.

Figure 3:
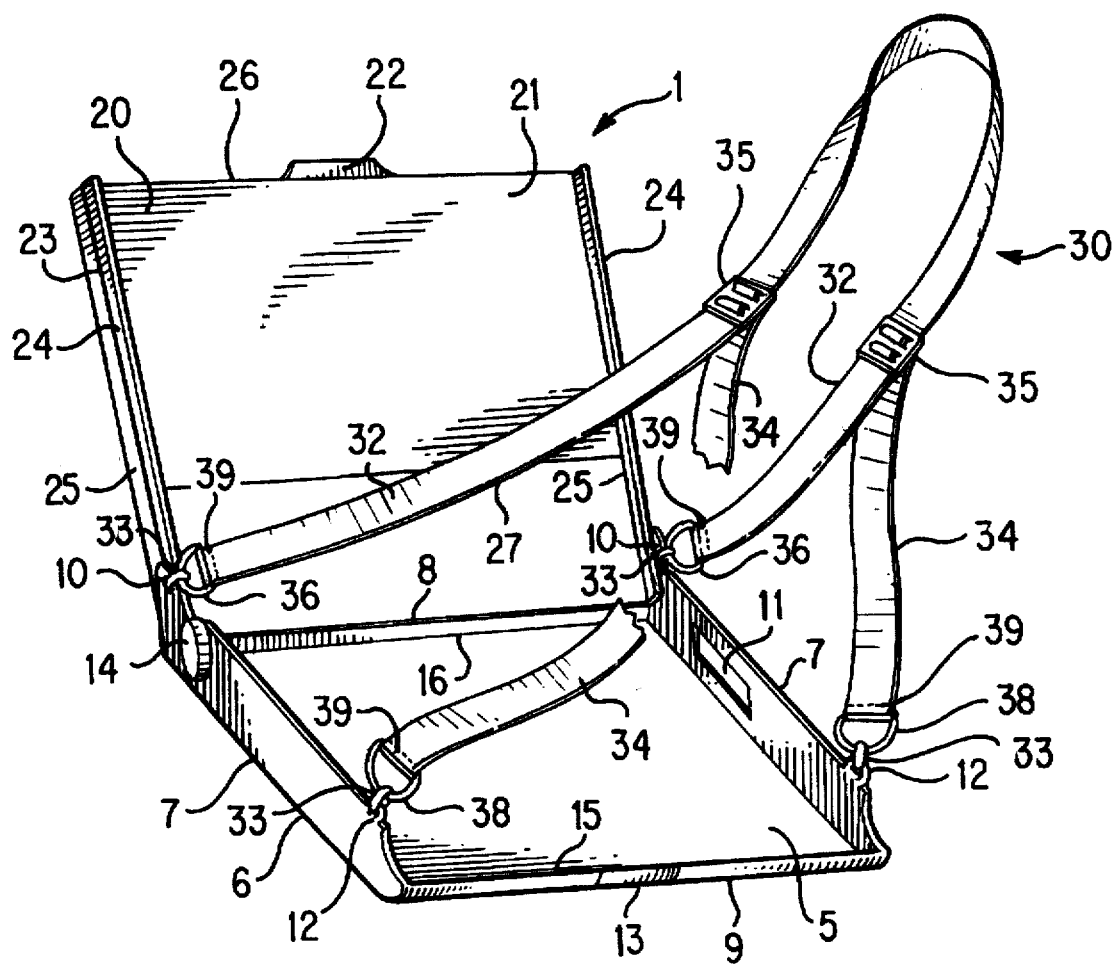
FIG. 3 is a perspective view of the present invention illustrating the lid and strap assembly.
Figure 6:
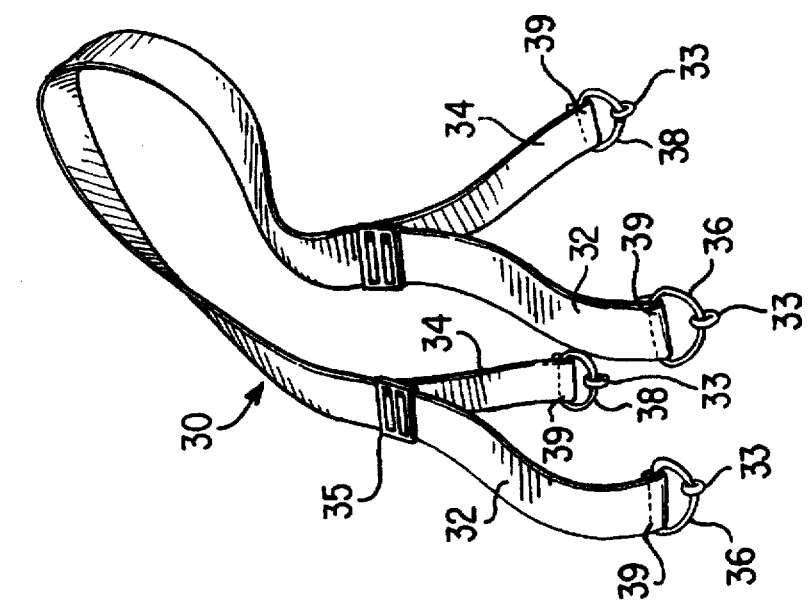
FIG. 6 is a view illustrating the strap assembly.
Figure 4:
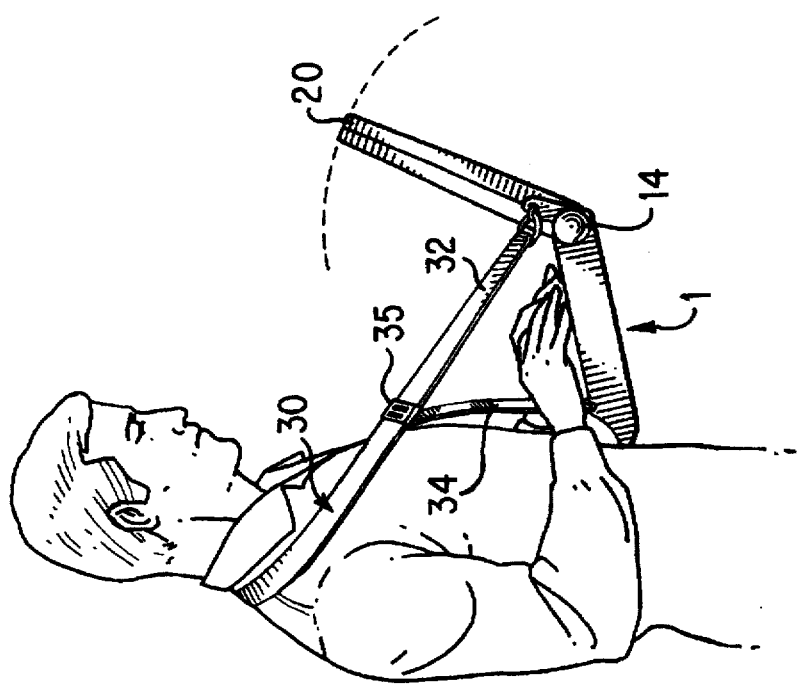
FIG. 4 is a side view of the present invention as attached to the user, illustrating the adjustability of the lid element and the proximity of the embodiment to the front surface of the body.

An embodiment of the invention is described by way of example with reference to the accompanying drawings in which:

There is shown in FIG. 1 of the drawings a perspective view of the laptop computer carrying tray embodying the features of the present invention, the central carrying tray which defines a receiving space for the laptop model computer unit being generally indicated by the numeral 1. The laptop model computer unit, which is illustrated in the same Figure, is generally indicated by the numeral 2 and consists, when in either its open or enfolded position, of two casements hinged together and of near-equal dimension, the upper casement 3 containing the screen element, and the lower casement 4., containing the keyboard or horizontal surface. The present invention contains a rectangular compartment, or central carrying tray 1, having an open top 5, a closed bottom 6, two side walls 7, a partially-open rear wall 8, a partially-open front wall 9, and a lid 20 with two side arms 25 attachable at their ends to a spool adjustment means 14 situated within the exterior side walls 7 of the central carrying tray 1. As seen in FIGS. 3, 4 and 6, tray 1 is supported by adjustable shoulder straps 30 with a first end 32 and a second end 34 containing clasps 36,38 secureably attachable to the holes 10 situated at the backmost corner of sidewalls 7 and the holes 12 situated at the frontmost corner of the sidewalls 7 of the central carrying tray 1. Access to the laptop computer unit's internal floppy disk drive is provided by a space 11 located within the sidewall 7 of the central carrying tray. The present invention may be provided with suitable self-adjusting security straps or self-adjusting loop means formed of nylon or a similar material by which the central carrying tray 1 may be arranged, offering access from or to the the laptop computer unit's entire horizontal and vertical surface, to the user. Catches 33 attaches to the secureable clasps 36,38 at the ends of the self-adjusting shoulder straps 30. The self-adjustable shoulder straps 30 are adjustable by means of buckles 35 situated at its center which provides a secure balance support between the user's body as shown in FIG. 2 and the present invention by way of attaching its ends 32 and 34 by way of clasps 36,38 to the holes 10, 12 formed in the upper corner of each of the four side walls 7 of the central carrying tray 1 adjacent to the open top 5.

Figure 2:
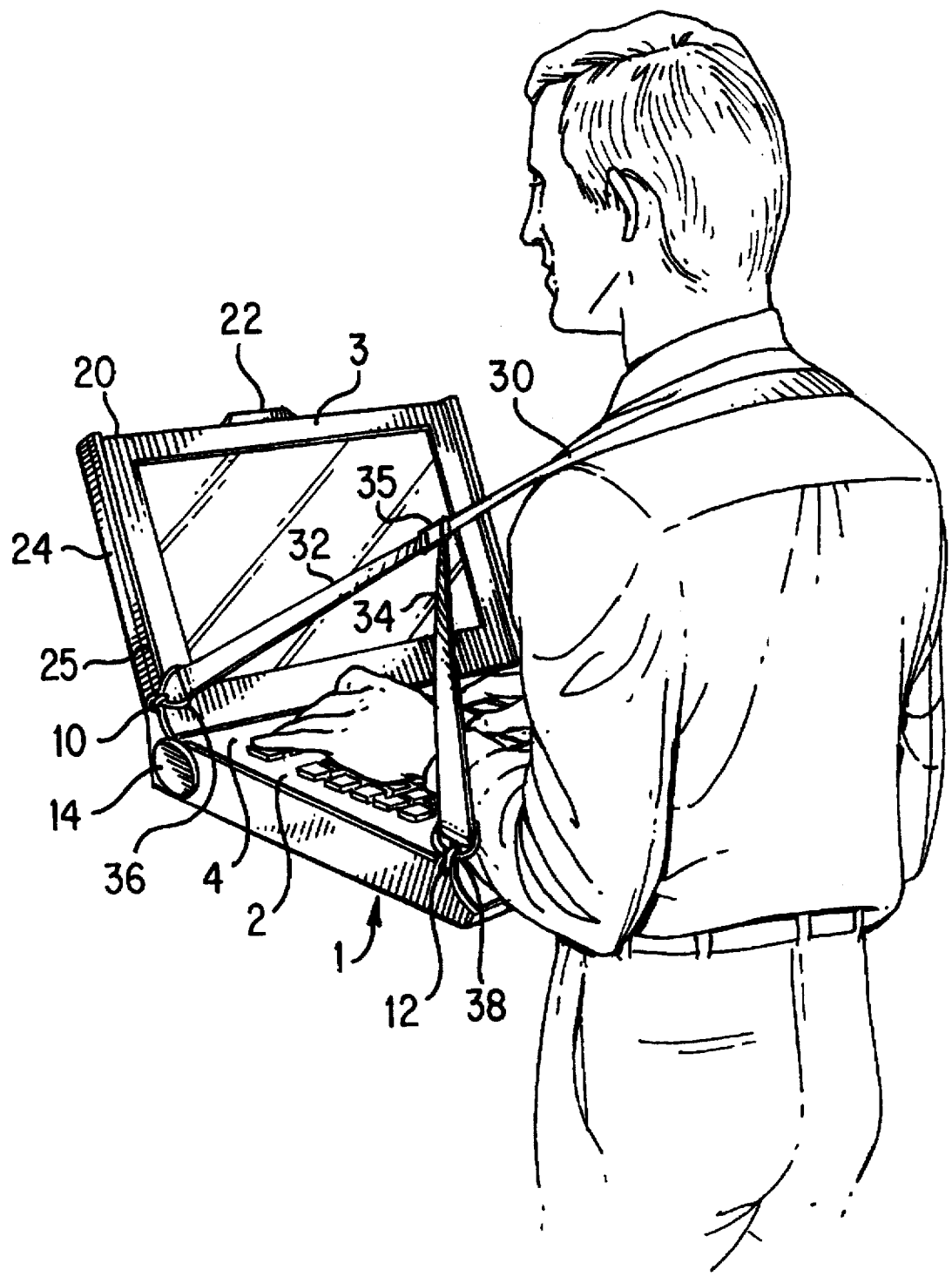
FIG. 2 is a pictoral view showing the present invention as securably attached to the user by way of the strap assembly.

Referring now to FIG. 2 there is shown a pictoral view of the attachable embodiment of the present invention containing the portable laptop model computer unit secured within the receiving space of the central carrying tray 1 with the user operating the device when in its operational mode or open position. In this position, the user, who is seated with the present invention secured from the central carrying tray 1 as attached, respectively, to the adjustable shoulder straps 30 extending from the front of the user's body which then is situated around the back portion of the neck. The central carrying tray 1, which is ideal for containing the laptop model computer unit within its receiving compartment 6, may be adjusted in a perpendicular orientation to the front of the user's body and thus proportionally secures the laptop model computer unit's lower casement 4, i.e., the keyboard or horizontal surface of the unit, directly before the user, the lower casement resting within the central receiving space 6 within the side walls 7 interior of the central carrying tray 1. The laptop model computer unit may be secured within the central carrying tray 1 by sliding its entirety, when either in its enfolded or opened position, through the partially-open front wall 9. Once inserted within the receiving space of the central carrying tray 1, the laptop model computer unit may then be secureably contained by the slight horizontal lip 15 of the partially-open front wall 9 and the horizontal lip 16 of the partially-open rear wall 8 which act as stabilizers for retaining the lower casement 4 of laptop model computer unit as whole.

As shown in FIG. 3, the invention contains a lid 20 having a front end 21 with a security catch 22, suitably secureable to the latch 13 situated at the center of the partially-open front wall 9 of the central carrying tray 1, a back end 23, two side walls 24 wherefrom extend two side arms 25, a top 26 and a bottom 27. The side ends 24 of the lid are secured to the central carrying tray 1 by way of its arm elements 25 which attach to the backmost exterior portion of the side walls 7 of the open top 5 of the central carrying tray 1 and provide necessary space by way of their approximate space between the bottom 27 of the lid 20 and the partially-open rear wall 8 for the laptop computer unit, when in its self-enfolded position with the screen element flush with the keyboard or horizontal surface, to slide through the partially-open rear wall 8 of the central tray 1, allowing the screen element of the laptop computer unit's upper casement 3, once secured within the central carrying tray 1, to rest upon the front 21 of lid 20 upon being reopened. The lid 20 allows the user easy open and close access to the laptop computer unit's entirety, including, in addition to the unit's screen element, the keyboard or horizontal surface, when in use or when in its non-operational mode. The side walls 24 of the lid 20 extend from its front 21 and are attached at their arms 25 to the securement adjustment spool 14 which protrudes from each of the backmost portions of the exterior of side walls 7 near the rear wall 8 of the central carrying tray 1. In conjunction with the adjustment spool 14, the lid 20, which serves as a backrest, supports the screen element of the laptop model computer unit's upper casement 3 which may then be adjusted in its in relation to the central carrying tray 1 by rotating the adjustment spool 14 from the lefthand side of the exterior sidewall 7 in a counterclockwise direction. As shown in FIG. 4, the adjustment spool 14, when rotated, may allow for the precise positioning of the lid 20 from a typically 45° angle, ideal for visibility of the screen element before the user, as when the laptop computer unit is in its normal operational use, to a flat 90° angle, the upper and lower casements of the laptop computer unit 3,4 extending outward or inward from either side of the entire central carrying tray 1, thus additionally allowing for greater visability of the laptop computer unit's screen element along its vertical-to-horizontal plane.

The present invention contains two adjustable shoulder straps 30. Preferably, the shoulder straps of the carrying strap assembly 30 are secured together so the central carrying tray 1 may be slipped or secured into the truss-like arrangement and thus be retained therein against the front of the user as extending from the shoulders and neck. Further, the adjustable shoulder straps 30 are arranged in such a way as to prevent the entire computer carrying tray from slipping outward to a position non-perpendicular to the front of the user's body. The strap which contains clasp 38 at its second end and which normally rests flat with the front of the user's body, may, for additional reinforcement of the central carrying tray 1, be worn around the shoulder and back of the user as illustrated in FIG. 2.

Referring now to FIG. 6, there is shown the adjustable shoulder strap means. Each of the two adjustable shoulder straps 30 has a first end 22 and a second end 34. The first end 32, which contains a clasp 36, is securably attachable to the backmost portion of the side wall 7 of the central carrying tray 1 as hooked through the holes 10 located at the back corner of the central carrying tray 1. The second end 34, which contains a clasp 38, is secureably attachable to the frontmost portion of the side wall 7 of the central carrying tray 1 as secured through the holes 12 situated at the corner of the central carrying tray unit 1. As shown in FIG. 4, the adjustable shoulder straps 30 are oriented to the laptop computer unit user's body by way of a buckle adjustment means 35 which allows for a fast and direct adjustment of the strap in respect to the width and length of the user's front. The buckle adjustment means 35 is secured to the shoulder straps 30 inward of each first end 32. As illustrated in FIG. 6, the adjustable strap 30 is threaded through the buckle adjustment means 35 and its ends 32 and 34 are sewn together to form a loop 39. Strap 30 is then threaded through the buckle adjustment means 35 in a manner which allows the strap 30 to be tightened or loosened by pulling the downward strap 38 through the buckle adjustment means 35 in respect to the entire carrying unit, the adjustable shoulder strap 30 and its ends 32 and 34. The adjustable shoulder straps 30 are secureable over a user's neck, their backmost portion, where the strap's surface touches the back of the user's neck optionally cushioned in a similar manner to the arm support strap means typically found on an over-the-shoulder backpack or an over-the-shoulder bookbag. The user may thus adjust or position the embodiment, including the central carrying tray 1, in direct proximity to the lap and stomach and shoulders. The buckle adjustment means 35 allows the user to firmly secure the central carrying tray 1 when in its operational position in respect to the size and exact width of the user's shoulders and stomach.

As previously discussed, the adjustable strap means 30 may be additionally used in conjunction with a variety of support means ideal for carrying the laptop computer carrying tray along the user's front or from the back and side, including, although not limited to in their arrangement, various applications such as an over-the-shoulder or around the waist securement strap means or a strap means which would circumferentially wrap around the entire computer carrying tray. The straps may additionally have buckles, side fasteners, snap or the like in order to allow the adjustability lengthwise.

Figure 5:
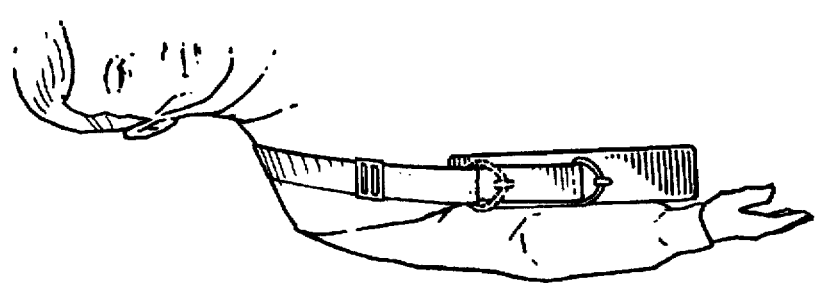
FIG. 5 is a side view of the present invention as shown with the over the shoulder strap securement secured to a side position to the user.

The present invention also contemplates a method of carrying the unit when in its enfolded position to the side of the user's body by way of the strap means 30 and the central carrying tray 1, as described above. The central carrying tray 1 may be enfolded to the carrying position from the to the front as shown in FIG. 4, wherein it is oriented from a perpendicular position in relation to the user's body to a flat position directly flush with the front of the user's body. This is achieved by closing the lid 20 which is hingedly attached by way of its arms 25 near the backmost portion of the side walls 7 of the central carrying tray 1, downward from its near-vertical, upright position, as when in its operational mode, to a horizontal position onto the open surface 5 of the central carrying unit 1 wherefrom the frontmost center of lid 20 is secureable with a catch means 13 situated at the center of the bottom of the partially-open front 9 of the invention's central tray 1. Once the lid 20 is positioned shut, with the entire unit enfolded flush with the open top 5 of the central carrying tray 1, the device may then be rotated from its perpendicular position, with the rear end 8 moving upward, allowing straps 30 to catch the invention in its entirety from the clasps 36, 38 situated at the ends 32 and 34, thus, securing the unit by way of the holes 10,12 in an upright lateral position in proximity to the front of the user's body. As illustrated in FIG. 5, the unit may then be shifted from its front upright position toward the side of the user who may then carry the entire embodiment with the laptop computer model unit intact in a similar manner as they may carry an over-the-shoulder attache case when positioned sidewise at the hip or at the waist level.

When the laptop computer is closed, that is when security latch 22 is secured to latch 13 and the laptop computer is in a horizontal disposition, its center gravity is roughly at its geometric center between sidewalls 7, rear wall 8 and front wall 9. This center gravity obviously is well inside an imaginary polygon (a rectangle) the corners of which are defined by holes 10 and 12. If lid 20 is then opened through an angle of about 135° to its position shown in FIGS. 1 through 4, the center of gravity of the laptop computer, as a whole, moves forwardly, but still is well within a polygon defined by the four holes 10 and 12. This is particularly so, because, as is well known in the art, lid 20 which pivots is much lighter than the remainder of the laptop computer which remains stationary. Accordingly, the laptop computer is, when in use as illustrated in FIGS. 2 and 4, supported by straps 30 at their first ends 32 and second ends 34, which are thus in a state of tension, and this supported disposition of the laptop computer endures irrespective of whether lid 20 is completely opened 180°, is closed or is in intermediate position.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

The above disclosure sets forth a number of embodiments of the present invention. Other arrangements or embodiments, not precisely set forth, could be practiced under the teachings of the present invention and as set forth in the following claims.

The embodiment of the instrument is offered in the following claims.

What is desired to be protected under LETTERS PATENT of the United States Patent Office is here claimed:

1. A portable laptop type computer unit housing assembly comprising:
 a) a portable laptop style computer unit including an upper casement and a lower casement;
 b) a flat rectangular tray having a closed bottom wall joined to two side walls, a partially open front wall including a first lip, and a partially open rear wall including a second lip, each of said two side walls having two projections extending therefrom, each of said projections including an aperture; and
 c) two shoulder straps;
  said shoulder straps releasably attached to said apertures, and said lower casement releasably secured to said first and said second lips.

2. A portable laptop style computer unit housing assembly in accordance with claim 1, wherein said tray comprises a lid hingedly connected to said bottom wall by a hinge mechanism that selectively adjusts and secures the tilt of said lid relative to said bottom wall wherein when the laptop computer is in use and is being supported by said shoulder straps, said lid is tilted relative to said bottom wall at a selected angle between 90° and 180°.

3. A portable laptop type computer unit housing assembly in accordance with claim 2, wherein said selected angle is about 135°.

4. A portable laptop type computer unit housing assembly comprising:
 a) a portable laptop style computer unit including an upper casement and a lower casement;
 b) a flat rectangular tray having a bottom wall joined to two side walls, a partially open front wall including a first lip and a partially opened rear wall including a second lip, each of said two side walls having fastenings; and c) two shoulder straps, said shoulder straps releasably attached to said fastenings, and said lower casement releasably secured to said first and second lips.

5. A portable laptop style computer unit housing assembly in accordance with claim 4, comprising a lid hingedly attached to said bottom wall, said hinge mechanism selectively adjusting and securing the tilt of said lid relative to said bottom wall whereby said lid is tiltable relative to said bottom wall at a selected angle between 90° and 180°.

6. A portable laptop type computer unit housing assembly in accordance with claim 5, wherein said selected angle is about 135°.

7. A portable laptop type computer unit housing assembly comprising:

a) a portable laptop style computer unit including an upper casement and a lower casement;

b) a flat rectangular tray having a bottom wall joined to two side walls, a lid hingedly connected to the rear of the tray by a hinge mechanism that selectively adjusts and secures the tilt of the lid relative to the tray whereby the lid is tiltable relative to said tray at a selected angle between 90° and 180°;

c) shoulder straps, said shoulder straps connected to each of said side walls and arranged and constructed so that a person can support said tray by means of said shoulder straps so that said lower casement is supported on said tray in a substantially horizontal position and said upper casement is supported by and substantially parallel to said lid when said lid is tilted and secured at said selected angle.

8. A portable laptop type computer unit housing assembly in accordance with claim 7, wherein said selected angle is about 135°.

9. A portable laptop type computer unit housing assembly in accordance with claim 7, wherein said tray is rectangular as seen in plan and said shoulder straps are attached thereto proximate the four corners of said tray.

10. A portable laptop type computer unit housing assembly in accordance with claim 7, wherein said tray comprises a partially opened front wall including a first lip, a partially opened rear wall including a second lip, said lower casement being releasably secured by said first and said second lips.

11. A portable laptop type computer unit housing assembly comprising:

a) a portable laptop style computer unit including an upper casement having a viewing screen, and a lower casement having a keyboard;

b) a first support for said upper casement, and a second support for said lower casement, said first and second supports being hingedly connected to each other;

c) shoulder straps connected to said second support which are arranged for accommodating said computer unit for operational use wherein said keyboard is supported by said second support so that it is arranged substantially horizontally immediately forward of the person using the computer unit while said first support supports said screen on said upper casement at a selected angular disposition between about 90° and 180° relative to said lower casement.

12. A portable laptop type computer unit housing assembly in accordance with claim 11, wherein said first support supports said screen on said upper casement at a selected angle of about 135° relative to said lower casement.

13. The combination of a laptop computer unit having a lower casement including a keyboard, said lower casement being hingedly connected to an upper casement including a screen, a supporting device for said laptop computer unit including at least four shoulder straps, said shoulder straps being joined so that when worn by a person operating said keyboard said straps are interconnected to said lower casement so that the centers of gravity of the laptop computer unit together with said supporting device are within a polygon defined by where said straps are interconnected to said computer unit when said computer unit is supported by said supporting device in a substantially horizontal disposition in both its operable disposition in which said upper casement is disposed at a selected angle between 90° and 180° relative to said lower casement and in its closed disposition in which said casements are folded together and are substantially parallel.

14. The combination of claim 13, wherein said polygon comprises a rectangle with its corners proximate corners of said lower casement.

15. The combination of claim 13, wherein when said computer unit is in its operable disposition, said upper casement is disposed at an angle of about 135° relative to said lower casement.

* * * * *